US010230583B1

(12) United States Patent
Cheng et al.

(10) Patent No.: US 10,230,583 B1
(45) Date of Patent: Mar. 12, 2019

(54) MULTI-NODE OBJECT SIMULATION

(71) Applicant: Amazon Technologies, Inc., Seattle, WA (US)

(72) Inventors: Pablo Puo Hen Cheng, Pomona, CA (US); Jesse Aaron Van Beurden, Irvine, CA (US); Rosen Ognyanov Baklov, Lake Forest, CA (US); Igor Gorelik, Irvine, CA (US)

(73) Assignee: Amazon Technologies, Inc., Seattle, WA (US)

( * ) Notice: Subject to any disclaimer, the term of this patent is extended or adjusted under 35 U.S.C. 154(b) by 687 days.

(21) Appl. No.: 14/859,189

(22) Filed: Sep. 18, 2015

(51) Int. Cl.
*G06F 15/173* (2006.01)
*H04L 12/24* (2006.01)

(52) U.S. Cl.
CPC ............ *H04L 41/145* (2013.01); *H04L 41/50* (2013.01)

(58) Field of Classification Search
CPC . H04L 67/02; H04L 67/2842; H04L 67/1097; H04L 67/10; H04L 67/42; H04L 67/1023; H04L 67/1095; H04L 47/125; G06F 17/30554; G06F 17/30324; G06F 3/067; G06F 17/3053; G06F 17/30575
See application file for complete search history.

(56) References Cited

U.S. PATENT DOCUMENTS

| | | | |
|---|---|---|---|
| 8,271,651 B1 | 9/2012 | Wang et al. | |
| 9,229,657 B1 | 1/2016 | Rus et al. | |
| 9,501,915 B1 | 11/2016 | Laska et al. | |
| 2002/0095403 A1 | 7/2002 | Chandrasekaren et al. | |
| 2002/0095454 A1 | 7/2002 | Reed et al. | |
| 2003/0115434 A1 | 6/2003 | Mahalingam et al. | |
| 2003/0177187 A1 | 9/2003 | Levine et al. | |
| 2004/0103182 A1 | 5/2004 | Krabel et al. | |
| 2004/0117345 A1* | 6/2004 | Bamford | G06F 17/3038 |
| 2004/0117377 A1 | 6/2004 | Moser et al. | |
| 2005/0060275 A1 | 3/2005 | Steuernagel et al. | |
| 2005/0278731 A1 | 12/2005 | Cameron et al. | |
| 2006/0069702 A1 | 3/2006 | Moeller et al. | |
| 2006/0149516 A1 | 7/2006 | Bond et al. | |
| 2006/0265554 A1* | 11/2006 | Carter | G06F 12/0817 711/144 |
| 2007/0097959 A1 | 5/2007 | Taylor | |
| 2007/0149216 A1 | 6/2007 | Misikangas | |
| 2008/0033812 A1 | 2/2008 | McKenna et al. | |
| 2008/0168390 A1 | 7/2008 | Benyamin | |
| 2009/0254601 A1 | 10/2009 | Moeller et al. | |
| 2010/0235409 A1* | 9/2010 | Roy | G06F 17/30094 707/812 |
| 2011/0055210 A1 | 3/2011 | Meredith et al. | |
| 2011/0126131 A1 | 5/2011 | Baszucki | |

(Continued)

*Primary Examiner* — Brian J. Gillis
*Assistant Examiner* — Thao D Duong
(74) *Attorney, Agent, or Firm* — Baker & Hostetler LLP

(57) ABSTRACT

Techniques for simulation of objects in a multi-node environment are described herein. Ownership of objects in a simulation scenario is assigned to a plurality of nodes based on a first set of criteria. Simulation authority of the first object is assumed by a second node based on a second set of criteria. Simulation of the first object is performed by the second node without previous acknowledgment, by the first node, of the assumption of simulation authority. Ownership of the first object is maintained by the first node during the time that the second node has simulation authority of the first object.

20 Claims, 7 Drawing Sheets

(56) References Cited

U.S. PATENT DOCUMENTS

| | | |
|---|---|---|
| 2011/0161451 A1 | 6/2011 | Hum et al. |
| 2011/0191628 A1 | 8/2011 | Noguchi et al. |
| 2013/0044106 A1 | 2/2013 | Shuster et al. |
| 2013/0121263 A1 | 5/2013 | Nguyen et al. |
| 2013/0283146 A1 | 10/2013 | Barak et al. |
| 2013/0346572 A1* | 12/2013 | Jain ................. G06F 9/5088 709/223 |
| 2014/0228115 A1* | 8/2014 | Kaplan ............. G06F 17/5009 463/31 |
| 2014/0359230 A1* | 12/2014 | Arora ................. G06F 13/14 711/146 |
| 2015/0382059 A1 | 12/2015 | Mano |

\* cited by examiner

MULTI-NODE OBJECT SIMULATION

BACKGROUND

In recent years, the use of electronically presented content has become increasingly popular and widespread. In some examples, certain electronically presented content, such as multi-player games, involve highly complex scenarios requiring significant computational resources. For example, a multi-player game may involve the simulation of a complex three-dimensional world with thousands of objects that must be simulated and rendered. Such complex scenarios may be implemented in a multi-node computing environment in order to distribute the computational tasks for more efficient and responsive processing. However, implementation in a multi-node computing environment requires allocation of simulation tasks and coordination between the nodes. When simulation responsibility for simulated objects is passed between nodes, delays may be introduced due to data exchange and coordination between the nodes. This can introduce graphics artifacts such as tearing and jitter, affecting the quality of the user experience.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
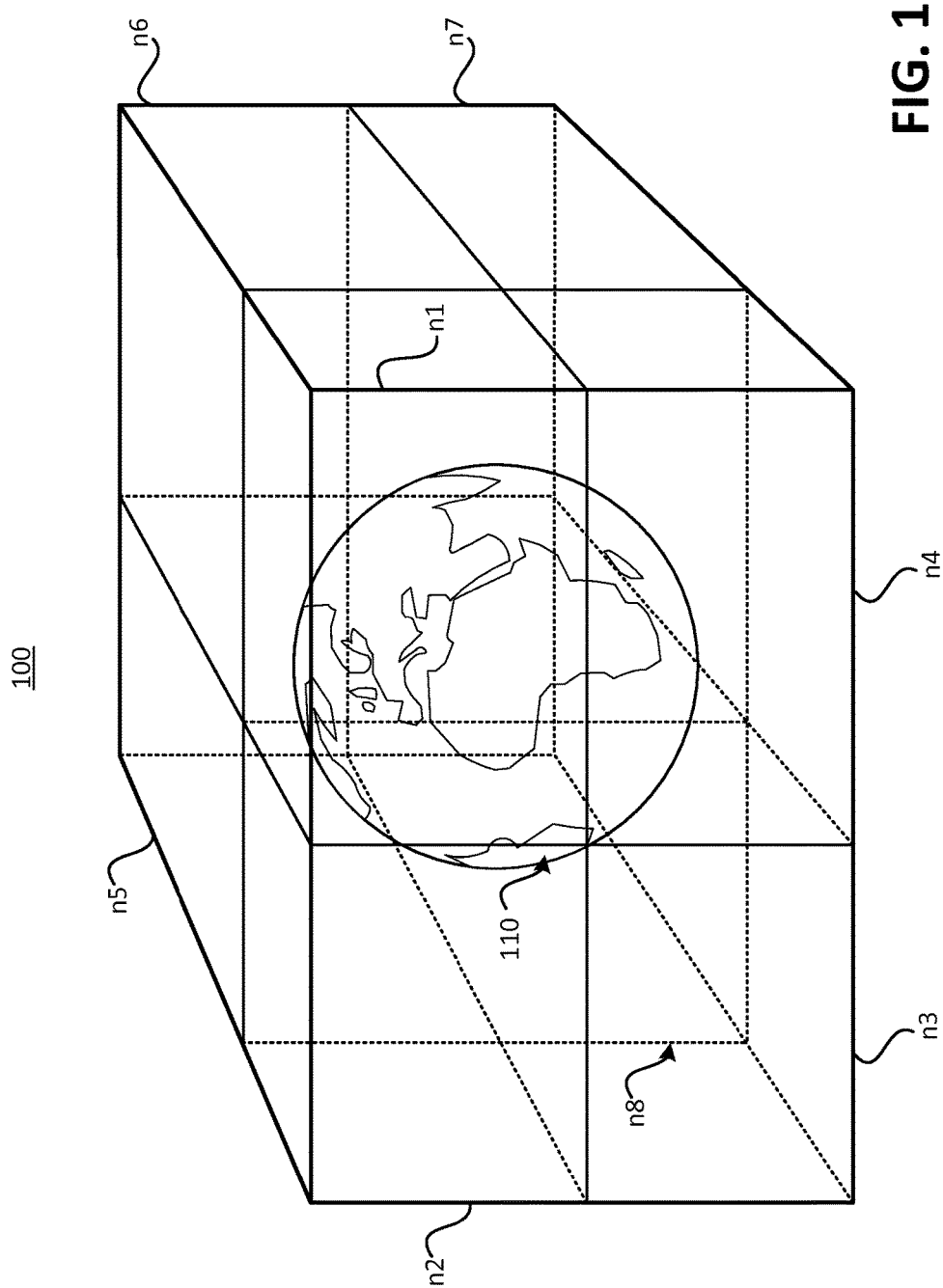
FIG. 1 is a diagram illustrating an example three-dimensional simulation and assignment of regions to nodes.

Techniques for real-time simulation using multiple computing nodes are described herein. In some implementations, mechanisms for transfer of simulation authority are used to avoid the need for transfer of ownership of simulated objects between nodes, allowing for reduction of lag and jitter, and providing a smoother user experience.

When a simulated multi-dimensional environment is implemented, simulation responsibilities for parts of the multi-dimensional environment may be distributed to the nodes of a multi-node system. Since multiple nodes may need to keep track of objects in the multi-dimensional environment, simulated objects of the multi-dimensional environment are typically processed by a master node and replicated across other nodes of the multi-node system. The nodes keep track of the replicated objects by receiving information about the movement of the simulated objects from the master node. The replicated objects may be regularly synchronized with respect to position, orientation, linear and angular velocity, etc. based on the information from the master node, thus allowing for each node to maintain a synchronized model of the multi-dimensional environment.

So long as the objects of the multi-dimensional environment are simulated by the master node, the other nodes may synchronize updated information for local replicas to maintain a synchronized simulation. However, it is often desirable to distribute master simulation responsibilities to the nodes of the multi-node system in order to better distribute processing load. In this way, simulations of objects may be performed by nodes having regions that are more proximate to the simulated objects. The results of the local simulations may be merged or combined by the master node and the synchronized results may be sent to the nodes. However, if a node other than the master assumes simulation responsibility for an object, then delays in the simulation may result because information updates must first be sent to the master node, which then integrates the simulation with simulation of other objects received from other nodes, which must then be sent back to all of the nodes in order to update their replicas.

Furthermore, if data packets transmitted between nodes are lost or corrupted in the network before they reach their destination, then the lost or corrupted data packets may need to be retransmitted over the network. Additionally, there may be bandwidth limitations in the network resulting in data packets having to be queued on the sending node before an opportunity to transmit them over the network. Such delays can introduce lag and possibly errors in simulation, and negate the efficiencies of utilizing a distributed system for processing the simulation. While the use of a single master node may allow for synchronized simulation using multiple nodes, the need for continuous data transfer can result in jitter. Jitter may generally be defined as any deviation from the expected refresh rate of graphics being generated by the multi-node network. Jitter may be observed in characteristics such as the frequency of successive pulses, the signal amplitude, or phase of periodic signals. The amount of jitter may vary depending on the network conditions and physics simulation parameters, but such jitter will typically result in graphics artifacts that generate undesirable video deficiencies for end users.

In the example of a large-scale multiplayer action video game, the game scenario may include a vast simulated universe that employs the simulation of multiple worlds, characters, and interacting objects that may be implemented across multiple computing nodes. During the course of play, large numbers of objects (e.g., vehicles, projectiles, animals, other elements of nature, etc.) may be created, destroyed, moved, and interact, all of which may be tracked and simulated by the computing nodes. Many objects may move across computing node boundaries during the course of play, resulting in a significant amount of data that may be transmitted between the computing nodes as simulation responsibility for the objects are transferred between computing nodes. Accordingly, a significant amount of jitter may result from the continuous delays resulting from the numerous transfers.

Disclosed herein is a way for nodes in a multi-node simulation scenario to assume simulation authority of a simulated object while reducing lag and jitter when simulation responsibility of an object is transferred between nodes. As used herein, simulation authority is used to describe responsibility for simulation of an object in a simulation scenario, the results of which are used to synchronize the state of the simulated object for replicas in the simulation scenario. Ownership of an object can include having control over the creation or destruction of an object, as well as final decisions, if needed, regarding conflicting claims to simulation authority of an object.

In some examples, simulation authority of an object can be claimed by a node without prior restrictions. The simulation authority can be claimed based on a set of criteria, and resolution of any conflicting claims to simulation authority by other nodes can be effected at a later time. In this way, there is no need for acknowledgements or transfer of information prior to acting on the simulation authority, thus eliminating any delays associated with such acknowledgements or information transfers. The node claiming simulation authority can simply begin simulation processing for the claimed object so that simulation information for the claimed object is available for nodes that need the information. In some examples, the contending nodes can continue simulation without waiting until the conflict is resolved, allowing for the simulation of the object to continue without lag or jitter and thus allowing for a smooth user experience. Simulations from contending nodes that are not valid claimants to simulation authority can be ignored.

In one example, when two or more nodes are contending for the simulation authority of the same object, the owner of the disputed object may select one of the contending nodes based on one or more conflict resolution criteria. Such conflict resolution criteria can include, for example, selection of the node that can simulate the object with the least amount of corrections needed by other nodes. For example, the node with the most recent information about the disputed object may be selected in order to allow for synchronization of replicas with minimal processing by the other nodes. Simulation data for the disputed object from the selected node may be allowed to be received by other nodes.

Although some examples of the disclosed subject matter are provided in the context of physical simulation of a three-dimensional simulated environment, the principles can be applied to any type of simulation involving multiple nodes in a distributed environment, where simulation responsibilities may dynamically change between nodes.

Referring to FIG. 1, illustrated is an example multi-node implementation of a simulation scenario. Illustrated is a simulated three-dimensional world 110, which is divided into eight regions. Each of the eight regions may be assigned to one of eight nodes n1 through n8. In some examples, the nodes may be a computing device such as a server, as described in further detail below. Furthermore, in some examples the simulated three-dimensional world 110 may be divided based on three-dimensional space and geography. Each assigned node may be assigned ownership of objects within the respective assigned region. The objects may include, for example, vehicles (e.g., cars, planes, etc.), projectiles, animals, other objects of nature (e.g., clouds, storm systems, etc.), and other entities that may exist in a simulated environment and that can be simulated using a physics engine or other simulation program. Initially, the assigned nodes may be assigned simulation authority for objects within the respective assigned regions. As the simulation of the simulated three-dimensional world 110 progresses, objects may be caused to move from one region to another and interact with objects in other regions owned by other nodes. Furthermore, objects that need to be tracked by more than one node may be replicated and the movement of the replicated objects may be synchronized to maintain accuracy and fidelity of the simulation as a whole. Aspects of ownership and load distribution are provided in U.S. patent application Ser. No. 14/859,186, entitled "DYNAMIC DISTRIBUTION OF SIMULATION LOAD," filed on Sep. 18, 2015, the entirety of which is hereby incorporated by reference.

In some examples, only one node is allowed to have master simulation authority of a given object in order to avoid conflicts and inconsistencies in the simulation. In some situations, master simulation authority for an object may be transferred from one node to another. For example, an object may have more interactions with objects in a node other than the current node that has simulation authority. The present disclosure addresses a way to transfer simulation authority in such situations while avoiding lags and jitter. Such lags and jitter may arise from delays due to transmission time between nodes, as well as the number of hops and round trips that are required for messages to travel between nodes. When an object changes simulation authority, multi-node implementations may take a number of steps to effect the change, including notifying the current owner of the object, communicating the action taken to all or at least the affected nodes, sending and receiving acknowledgements and confirmations by the current owner of the object, and notifying other nodes of the change of simulation authority. Depending on the communication protocols of the network, two, three or more round trips as well as one or more broadcast messages may be involved before simulation actually begins and simulation data is generated.

By allowing nodes to immediately take simulation authority without having to initiate an exchange of information and management data with other nodes, the delays due to network transmission and hops can be avoided. In the case where more than one node attempts to take simulation authority of an object, the owner or master of the object can select the node that is allowed to assume the simulation authority. The other nodes may be notified of the decision so that replicas of the simulated object will only be updated with the simulation information from the node selected to have simulation authority. Additionally, any information from nodes that were not selected to have simulation authority can be ignored by the other nodes. In this way, simulation of the object can be continued without delay, although it is possible for a time that multiple nodes will perform simulation of a contested object until the conflict is resolved by the master or owner.

Figure 2:
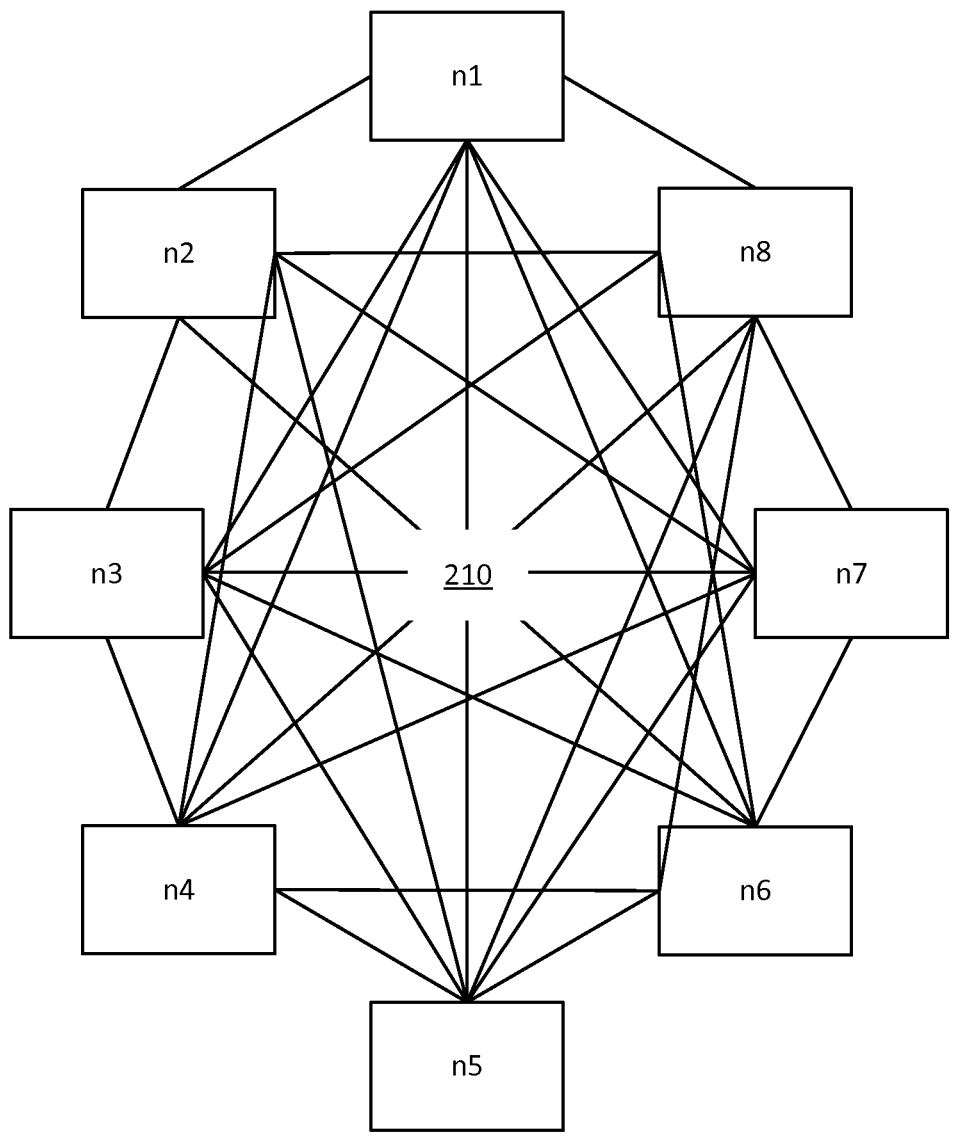
FIG. 2 is a diagram showing an example group of nodes that may be used in accordance with the present disclosure.

FIG. 2 illustrates a system of nodes n1 through n8 that are connected via a network 210. The specific topology can vary, and the network 210 may include any number of routers and other network devices. The network 210 may include one or more wide area networks (WANs) such as the Internet and/or one or more local area networks (LANs). As mentioned, nodes n1 through n8 may be suitable computing devices such as servers having one or more processors and memory. Together, nodes n1 through n8 may form a multi-node computing environment that may execute applications that simulate various environments, such as in a multi-player video game. It should be appreciated that the network topology illustrated in FIG. 2 has been greatly simplified and that more networks and nodes may be utilized. These topologies and devices should be apparent to those skilled in the art. It should also be appreciated the example system described in FIG. 2 is merely illustrative and that other implementations might be utilized. It should also be appreciated that a server or other computing device may comprise any combination of hardware or software that can interact and perform the described types of functionality, including without limitation desktop or other computers, database servers, network storage devices and other network devices. In addition, the functionality provided by the illustrated functions indicated as modules may in some embodiments be combined in fewer modules or distributed in additional modules. Similarly, in some embodiments the functionality of some of the illustrated modules may not be provided and/or other additional functionality may be available.

Figure 3:
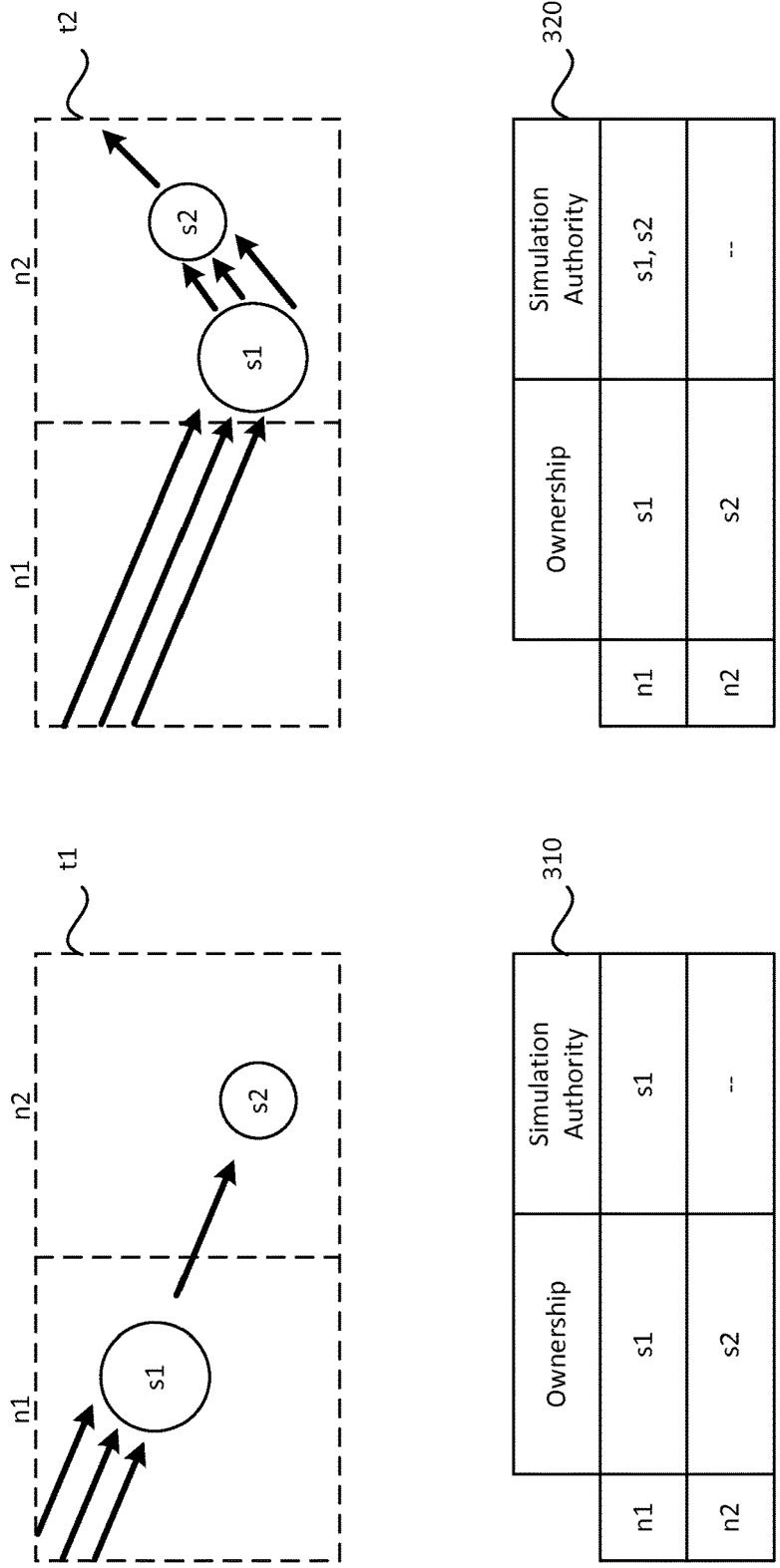
FIG. 3 is a diagram illustrating an example of changing simulation authority.

FIG. 3 illustrates an example of transfer of simulation authority between two nodes. In the example illustrated in FIG. 3, table 310 shows that node n1 has both ownership and simulation authority of simulated object s1. Node n2 has ownership of simulated object s2, and there is no node that currently has simulation authority of simulated object s2. Simulated object s2 may not currently be simulated because, for example, object s2 may not be in motion and/or may not be interacting with any other object. At time t1, the simulation of object s1 is shown approaching object s2. At time t2, the simulation of object s1 is shown hitting object s2, thus necessitating the initialization of simulation of object s2 in response. Node n1 at this time may claim simulation authority of object s2. In this example, there is no conflicting claim of simulation authority of object s2, and thus table 320 shows that node n1 now has simulation authority of object s2.

In some examples, simulation authority may be assumed if one or more criteria are met. Some example criteria may include:
1. The node claiming simulation authority of an object has simulation authority of at least one other object that is interacting with the claimed object
2. No other node currently has simulation authority of the claimed object
3. The node claiming simulation authority can only retain simulation authority if the node has a threshold amount of information about the claimed object.

In some examples, criteria (2) above may be optional, since conflicting claims of simulation authority are allowed, and it may be desirable to allow nodes to claim simulation authority even if an object already has a node with simulation authority. This may be useful, for example, to allow nodes with better information to "take" simulation authority from a node that may have less accurate information.

In one example of assumption of simulation authority of an object, a computing node that is performing simulation of an assigned region of a simulated universe as well as objects within the assigned region may track three groups of objects. The first group of objects may include objects for which the computing node has simulation authority. The computing node may perform physical simulation of these objects using a physics engine or other simulation engine, and may also send calculated simulation information to the other computing nodes so that the other nodes may track the movement of these simulated objects.

The second group of objects may include objects that the computing node is not currently simulating but is tracking. The computing node may track such objects to maintain awareness of actions occurring at the boundaries of the computing node's assigned region. In some embodiments, the computing node may maintain replicas to track objects in this second group. Replicas are copies of objects that may be tracked by a computing node. The computing node may receive updated information regarding the location and movement of the replicas from nodes that have simulation authority of the replicas.

The third group of objects may include objects that the computing node is not currently simulating and is tracking, but which is currently not being simulated by another computing node. Such objects may have been previously simulated by another computing node, but that computing node may have relinquished simulation authority for that object. A computing node may relinquish simulation authority for an object when simulation of the object is no longer needed. For example, an object may have come to rest and is no longer interacting with other objects, and therefore the object may not need to be actively simulated for at least a time. The computing node may continue to track replicas that are both being simulated or that are not being simulated in order to maintain awareness of these objects in the event that future motion of simulated objects result in an interaction with the replicas.

When motion of simulated objects results in an interaction with a replica that is not currently being simulated, the computing node may determine whether to assume simulation authority of the replica based on one or more of the criteria described above. For example, if the replica is at the boundary of the computing node's assigned region, and if the anticipated interaction with the object may result in movement of the replica into the computing node's assigned region, then the computing node may determine to assume simulation authority of the replica.

In another example, a replica that is actively being simulated by another computing node may move into the assigned region of the computing node. Based on one or more of the above criteria, the computing node may determine to assume simulation authority of the replica. For example, the computing node may determine that the replica will enter the assigned region of the computing node, and will further interact with other objects for which the computing node has simulation authority.

The disclosed examples illustrate implementation of changes in simulation authority, but the principles can also be applied to changes of ownership by the nodes.

In some examples, the owner of an object may retain ownership of the object even if simulation authority has been relinquished. Initial ownership of objects may be allocated during initialization of the simulation scenario or at some other time. In an example, during startup of a simulation session, the simulated environment (e.g., a geographic region or some physical environment in a video game world) may be divided into regions which are allocated to the nodes of the multi-node system. The nodes may then take ownership of all objects within the allocated regions.

Ownership may also be allocated using other factors. For example, ownership of objects may be distributed based on computing capacity of the computing nodes. In some examples, ownership may be allocated among computing nodes based on processing power, available memory capacity, and other computing attributes of nodes. Some computing nodes may have different configurations, resulting in different computing nodes having different capabilities for simulation processing. Additionally, it may be advantageous in some cases to keep simulation of objects of a particular type (e.g., weapons, vehicles, etc.) with one computing node. For example, objects associated with a particular group or objects are known to interact frequently with other objects owned by the computing node may be assigned to the computing node for ownership.

The initial allocation may also be adjusted in some cases for load distribution purposes. For example, a region with two large simulation islands may be further divided into two regions so that the processing load can be more evenly distributed between computing nodes.

In some examples, an owner of an object may retain full control of an object, including its creation, destruction, physical simulation, and control over updates to the object. In the examples described in this disclosure, the ability to generate the master physical simulation parameters (e.g., position, orientation, linear and angular velocity) of an object that is synchronized with all replicas of the object is referred to as simulation authority. The computing node that has simulation authority over an object is therefore responsible for generating the physical simulation parameters for the object that will be sent to other computing nodes for use in tracking replicas of the object.

The owner may delegate the simulation authority as well as other controls pertaining to an object that is owned. In the examples described herein, the owner typically delegates or relinquishes simulation authority of an owned object while retaining other controls over the object, such as control over the deletion or destruction of an object. In other examples, nodes may also delegate or relinquish controls other than those associated with simulation authority such as relinquishing all controls associated with ownership of an object. In some examples, controls associated with simulation authority may be considered a subset of the controls initially associated with ownership of an object.

A node that owns an object may relinquish simulation authority under certain conditions. For example, if the owning node no longer has information about an object that may be needed for simulation of the object, the node can relinquish simulation authority of the object. As another example, the node can relinquish simulation authority of the simulated object if the object is no longer in motion and no longer interacting with any other objects. The multi-node environment may impose other conditions under which simulation authority can be relinquished by a node.

An object that has been relinquished with regard to simulation authority may remain in this state for a period of time during which no interactions occur with any other objects and/or the object is not otherwise needed in any simulation scenarios. The existence of the object may be maintained and the state of ownership of the object may remain in place. Furthermore, any computing nodes that have replicas of the object may store the last known data about the replicas since future interactions with the object may occur. When such interaction occurs or is expected to occur, simulation authority of the object may be assumed in the manner described herein.

Furthermore, in some embodiments the owner of an object may continue to control the flow of simulation data for the object even when simulation authority of an object is assumed by another node. For example, the computing node that has simulation authority of the object may send simulation data to the owning node, which may then distribute the simulation data to those nodes that are maintaining replicas of the object. In some embodiments, the owning node may track which of the other nodes are maintaining replicas and broker the simulation data so that these nodes receive simulation data for an object. The owning node may therefore be considered the source of simulation data for an object so that the other nodes need not continuously track which node currently has simulation authority for an object.

In some simulation scenarios, a group of interacting objects may be referred to as a simulation island. A simulation island may be a group of actively simulated objects that are in physical contact with each other. In some examples, simulation authority for a simulation island may be assigned to a single node for computational efficiency. For example, when a simulation island is activated, simulation authority may be assigned to the node that activated the simulation island. When two simulation islands with different simulation authorities merge, the simulation islands may be evaluated to determine which node should assume simulation authority over the merged simulation islands. For example, the simulation islands may be scored based on a heuristic to determine which node should be assigned simulation authority. In some examples, simulation authority of an entire simulation island may be relinquished if there is no more simulation activity for any objects in the simulation island.

As discussed, in some cases more than one node may claim simulation authority over an object. In some examples, the node that owns the disputed object may select the node that is to actually be assigned simulation authority. The selection may be based on one or more criteria. For example, the selection may be based on favoring the node that already has simulation authority over the object that interacted with the disputed object. If more than one node has simulation authority over an object that is interacting with the disputed object, then the node with the most number of objects that are interacting with the disputed object may be selected.

Additionally or alternatively, the node that has the most information about the disputed object may be selected. For example, nodes that claim simulation authority may have information about interacting or collision objects, owners of the interacting objects, objects and other parameters that are around the object, and so forth. In some examples, if the disputed object is part of a simulation island, then the node who already has simulation authority for the simulation island may be selected. In this way, groups of interacting objects that are parts of simulation islands may be consolidated to further to reduce network delays and thus reduce jitter.

In some examples, prediction analysis may be performed for objects that are at the boundaries of regions assigned to nodes. Prediction analysis may include prediction of objects that may interact with objects that are owned by a node at some future time. In this way, nodes can predict movements of objects so that changes in authority may be anticipated, allowing for a smoother transition of simulation authority, thus allowing for further reductions in delays associated with transfers of simulation authority.

In some examples, the nodes of the multi-node simulation environment may be notified when ownership for an object is pending. When a change in ownership of an object to a different node is pending, a broadcast message may be sent to the other nodes that a pending ownership change is in process.

The nodes that receive the broadcast message may wait to process any further information related to replicas of the object for which the change in ownership is pending. For example, messages that are received from the previous owner for the object may be placed in a queue. Upon confirmation by that the ownership change has been processed another broadcast message may be sent to the nodes indicating the change in ownership for the object. Any queued messages for the object may then be processed.

Figure 4:
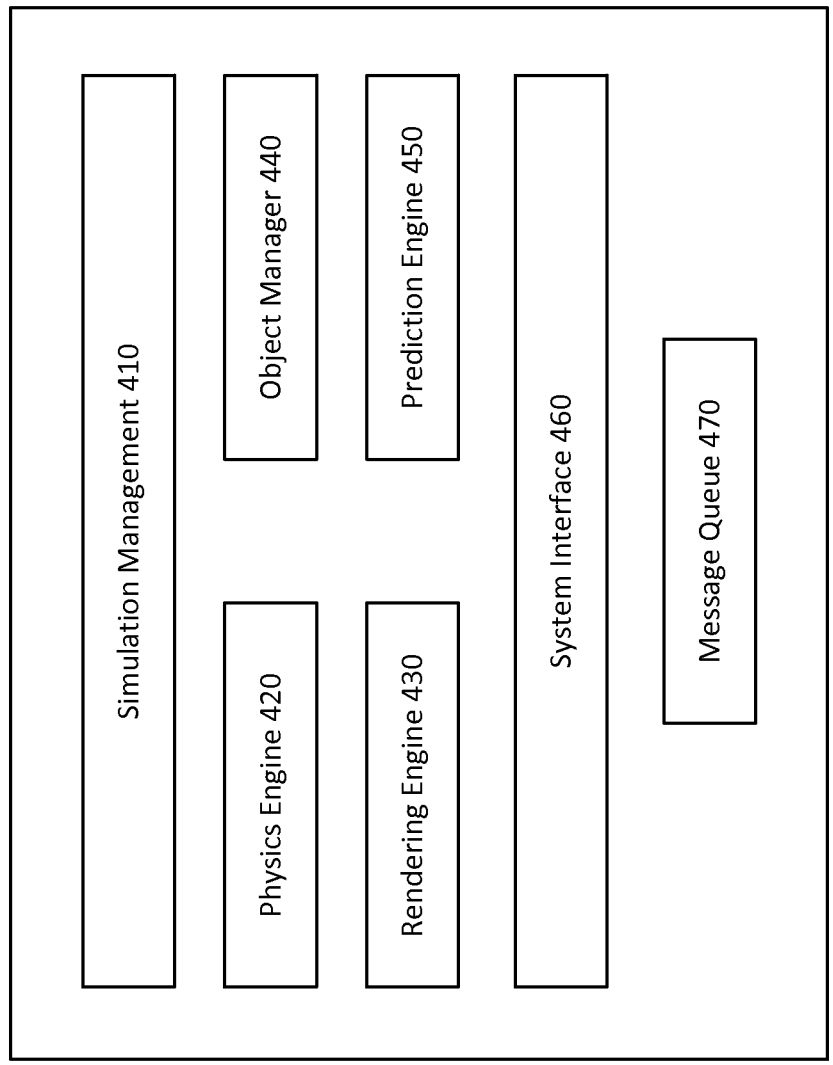
FIG. 4 is a diagram illustrating an example of functionality for simulation of objects in a multi-node environment that may be used in accordance with the present disclosure.

A diagram depicting example functionality for simulation of objects in a multi-node environment 400 that may be used in accordance with the present disclosure is shown in FIG. 4. In some examples, the depicted functionality may be implemented as software code executed by one or more nodes. As shown, functionality 400 for simulation of objects may include, for example, a simulation management function 410 that may be configured to monitor and manage the various processes and functions for owning and simulating objects in the simulation scenario. Functionality 400 for simulation of objects may also include a physics engine 420 configured to generate real-time simulation of objects including body dynamics and interactions with other objects. The physics engine 420 may be configured to simulate real world physics in multiple dimensions. The physics engine 420 may compute rigid body dynamics, soft body physics, and other dynamics depending on the application. In some examples, functionality 400 for simulation of objects may include a rendering engine 430 for generating graphics outputs for rendering on an output device such as a display. The rendering engine 430 may include one or more hardware or software implemented graphics processing units (GPUs) that may be used to generate graphics for rendering on a user interface. In other examples, the rendering engine may be provided at a client or user device, and the functionality for simulation of objects 400 may send the output of the physics engine 420 directly to the client or user device for rendering.

Functionality 400 for simulation of objects may also include an object manager 440 configured to track and manage the various objects that are owned by the node as well as objects for which the node has simulation authority. Functionality 400 for simulation of objects may also include a prediction engine 450 configured to perform prediction analysis for objects that are at the boundaries of the region assigned to the node. Prediction analysis may include prediction of objects that may interact with objects that are owned by the node or for which the node has simulation authority. Functionality for simulation of objects 400 may also include system interface 460 configured to manage and coordinate communications with other nodes in the multi-node system. Messages for transmission or messages that have been received from other nodes may be queued in message queue 470 until they are processed. Additionally, in the case where there is a pending change in ownership for an object for which the node has a replica, messages pertaining to the replica may be placed in message queue 470. Upon confirmation by the new owner node that the change in ownership has been processed, queued messages from the selected node may then be processed.

As should be appreciated, although only a single set of functionality 400 is shown in FIG. 4, multiple nodes may implement the depicted functionality, and the functionality may also be distributed over multiple nodes.

Figure 5:
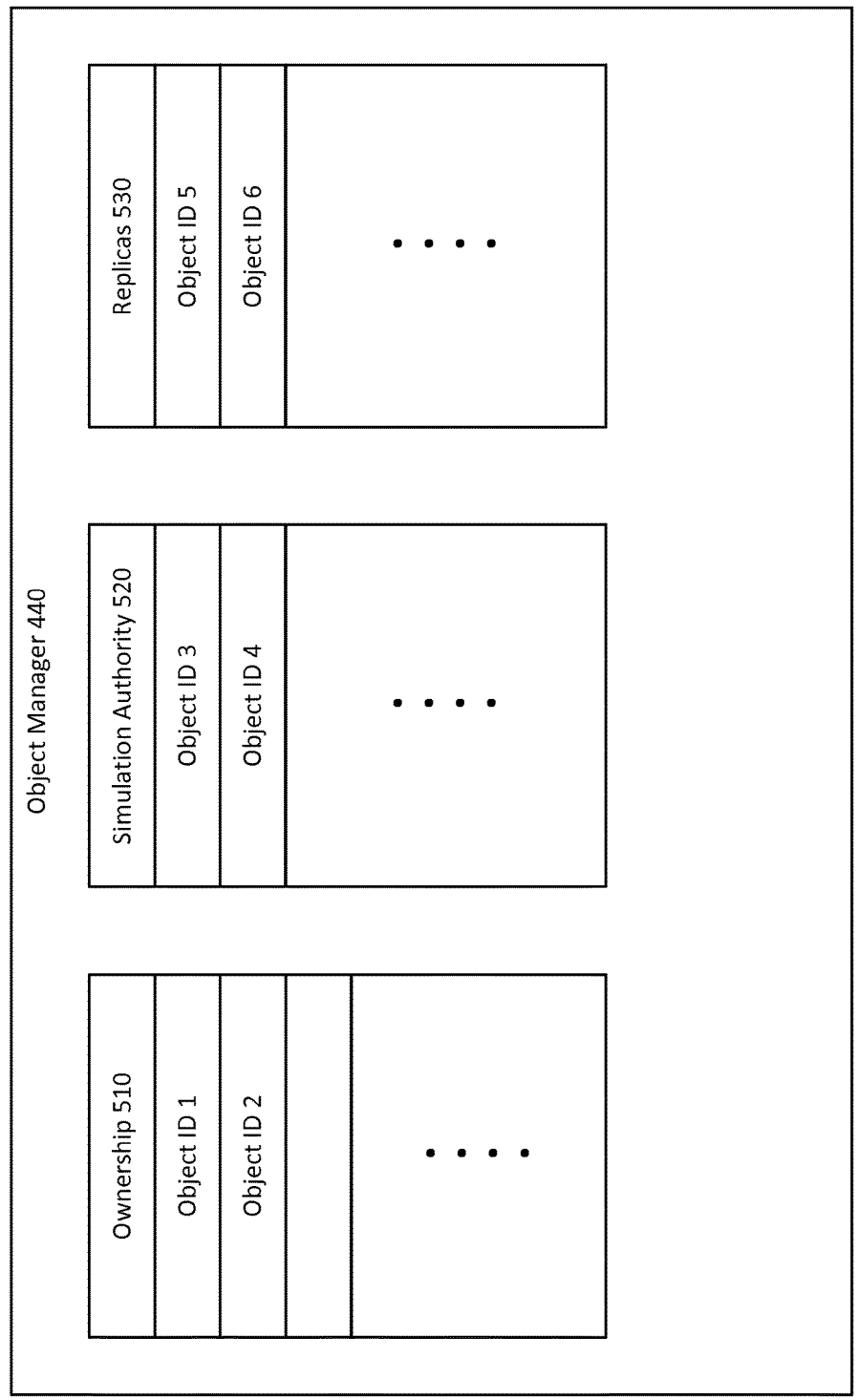
FIG. 5 is a diagram illustrating an example of an object manager used in simulation of objects in a multi-node environment in accordance with the present disclosure.

FIG. 5 depicts further details of the object manager 440 depicted in FIG. 4. In some embodiments, object manager 440 may be implemented on each computing node. However, in other embodiments, object manager 440 may be implemented to centrally manage objects in the simulation environment and may, for example, be implemented on a single computing node. Object manager 440 may include ownership records 510 that include object identifiers for objects that are owned by the node. Object manager 440 may also include simulation authority records 520 that include object identifiers for objects for which the node has simulation authority. Additionally, in some examples object manager 440 may include replica records 530 that include object identifiers for objects that are replicated on the node and for which updates from other nodes are to be received and processed to update the replicas. It will be appreciated by one skilled in the art that the data structure shown in FIG. 5 may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice and may depend on the technology, performance and other requirements of the computing system upon which the data structures are implemented.

Figure 6:
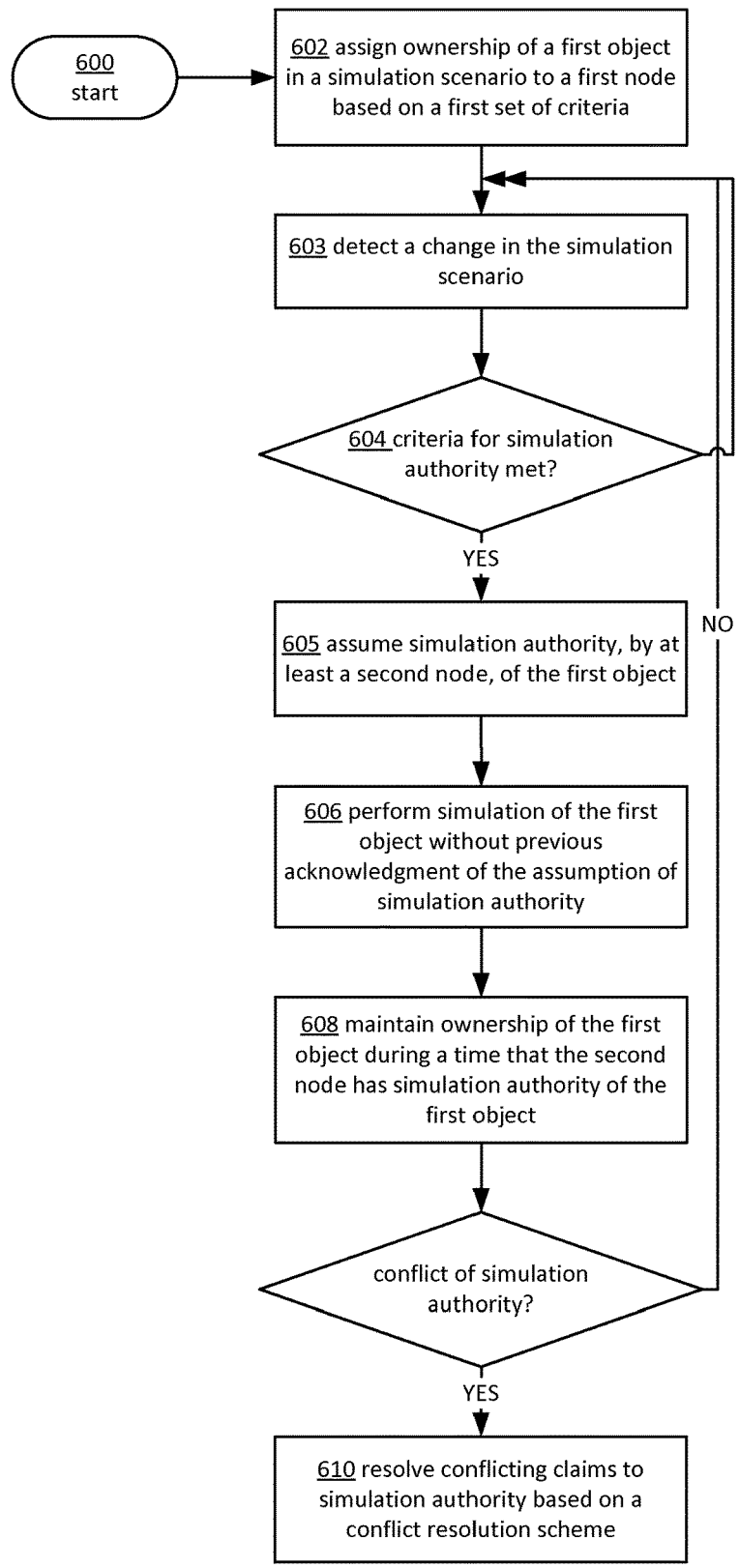
FIG. 6 is a diagram illustrating an example process for simulation of objects in a multi-node environment that may be used in accordance with the present disclosure.

FIG. 6 illustrates an example operational procedure for simulation of a first object in a multi-node environment. In an embodiment, the operational procedure may be implemented in a system comprising one or more computing devices. The computing devices may have memories that have stored thereon computer-executable instructions that, when executed, cause the system to perform operations as described. In one embodiment, the system may comprise a node as depicted in FIG. 2. Referring to FIG. 6, operation 600 begins the operational procedure. Operation 600 may be followed by operation 602. Operation 602 illustrates assigning ownership of the first object in a simulation scenario to a first node based at least in part on a first set of criteria. For example, a simulated three-dimensional world may be divided based on three-dimensional space and geography, and each of the plurality of nodes may be assigned ownership of objects within the respective assigned regions. In some examples, nodes may be assigned simulation authority for objects within the respective assigned regions. Ownership of objects may also be distributed based on computing capacity of the computing nodes. For example, ownership may be allocated among computing nodes based on processing power, available memory capacity, and other computing attributes of the computing nodes. Some computing nodes may have different configurations, resulting in different computing nodes having different capabilities for simulation processing. Additionally, it may be advantageous in some cases to keep simulation of objects of a particular type (e.g., weapons, vehicles, etc.) with one computing node. Additionally, objects that need to be tracked by more than one node may be replicated and the movement of the replicated objects may be synchronized.

In some embodiments, simulation authority of the first object may be relinquished by the first node. The first node may relinquish simulation authority of the first object, for example, if the first node no longer has information about the first object that may be needed for simulation of the first object. This can occur, for example, if the object is interacting with objects for which the first node does not have simulation authority. As another example, the first node can relinquish simulation authority of the first object if the first object is no longer in motion and is no longer interacting with other objects.

Operation 602 may be followed by operation 603. Operation 603 illustrates detecting a change in the simulation scenario. The change may include a change associated with the first object, such as a movement of the first object such that the first object moves into a region where the majority of objects in that region are simulated by a second node. In another example, the change may include an interaction by the first object with a second object for which the second node has ownership and/or simulation authority. Such an interaction may include a collision or any event where the movement or presence of the first object may affect the movement of the second object and vice versa. For example, if the first object has a magnetic force associated with it, the first object may have an interaction with the second object that causes a movement of the second object. This effect and movement may be simulated by the second node if the second node has simulation authority for the second object. Furthermore, the second node may have information about the interaction if the second node has a replica of the first object and the second node is receiving information regarding the movement of the first object.

In operation 604, it is determined whether a second set of criteria is met. If the second set of criteria is met, then operation 604 may be followed by operation 605. Operation 605 illustrates assuming simulation authority, by at least a second node, of the first object, the simulation authority based at least in part on a second set of criteria. In some examples, the second set of criteria may include allowing simulation authority to be assumed by the second node if the second node has simulation authority of at least one object that is interacting with the first object. As another example, the second set of criteria may include a criterion can be that no other node currently has simulation authority of the first object. In some examples, the second set of criteria may include a criterion that the second node may be allowed to claim authority if the second node has a threshold amount of information about the claimed object, such as dynamic body data for objects that have interacted with the first object and the identifier for the object.

In an embodiment, the second node may determine if the second node currently has information about the claimed object that is sufficient to perform physical simulation. This information may include physical dimensions of the object in three dimensions, the object's position and orientation in three dimensional space, the object's mass, other physical properties of the object such as color, texture, and elasticity, and simulation authority for at least one other object that is interacting with the claimed object. The second node may send a notification to the owner of the claimed object that the second node is claiming simulation authority for the claimed object. The second node may also send other information to the owner of the claimed object such as what information the second node has about the claimed object, and what other objects that the second node is currently simulating that are interacting with the claimed object.

In one embodiment, the owner of an object sends simulation data for the object to the other nodes even when another node has simulation authority for the object. In this embodiment, nodes that have simulation authority for an object but do not own the object will always send simulation data to the owning node. The owning node maintains information as to which nodes are maintaining replicas of the object, and can forward the simulation data to those nodes.

The owner of the claimed object may make a determination, based on the what information the second node has about the claimed object and what other objects that the second node is currently simulating that are interacting with the claimed object, that the second node may assume simulation authority for the claimed object. The second node may simply continue performing simulation processing of the claimed object without the need for explicit acknowledgment by the owner of the claimed object. In this way, the time associated with one or more sets of message transactions to perform such an acknowledgment can be avoided in order to reduce latency and jitter.

In the event that another node also claims simulation authority for the claimed object, the owner of the claimed object may make a determination based on factors such as what information each node has about the claimed object and the number of objects that each node has that are interacting with the claimed object. Each node that is claiming simulation authority for the claimed object may perform simulation processing and send the generated simulation data to the owner of the claimed object. Once the owner of the claimed object determines which of the nodes should have simulation authority for the claimed object, the owner may simply forward simulation data received from the selected node to the other nodes that have replicas of the claimed object. Although each node claiming simulation authority may continue simulation processing of the claimed object, only the data from the selected node is passed on to the nodes that have replicas of the claimed object. The owner of the claimed object may send a notification to the node that was not selected so that the non-selected node may discontinue simulation of the claimed object. By allowing nodes to claim simulation authority without acknowledgment, simulation may begin immediately and the owner of the claimed object may be able to forward simulation data to other nodes with minimal delay.

Additionally, in some examples, the second set of criteria may be a subset of the first set of criteria. For example, the criteria related to simulation authority of an object may be a subset of the criteria related to ownership of the object. Thus an owner of an object may perform operations related to simulation authority of the object as well as other controls such as creation and destruction of the object. When simulation authority of the object is relinquished, only the controls related to simulation authority, which is a subset of ownership controls, are relinquished by the owner.

Operation 605 may be followed by operation 606. Operation 606 illustrates performing, by the second node, simulation of the first object without previous acknowledgment, by the first node, of the assumption of simulation authority. In some examples, simulation authority of the first object can be assumed by the second node, and resolution of any conflicting claims to simulation authority can be effected at a later time. The second node does not need to wait for acknowledgements or transfer of information prior to assumption of simulation authority, thus eliminating any delays associated with acknowledgements or data transfers. The claiming node can begin simulation processing for the first object.

Operation 606 may be followed by operation 608. Operation 608 illustrates maintaining ownership, by the first node, of the first object during at least part of a time that the second node has simulation authority of the first object. In some examples, the first node may continue to be the owner of the first object, including maintaining control over the creation or destruction of the first object. In one example, the first node may make final decisions, if needed, regarding conflicting claims to simulation authority of the first object. If a conflicting claim to simulation authority of the first object exists, then operation 608 may be followed by operation 610. Operation 610 illustrates resolving, by the first node, conflicting claims to simulation authority of the first object based at least in part on a conflict resolution scheme. The conflict resolution scheme may, for example, consider which nodes already have simulation authority over any objects that are interacting with the first object. If more than one node has simulation authority over the object that is interacting with the first object, then the conflict resolution scheme may consider which of the conflicting nodes have a greater number of objects that are interacting with the first object. The conflict resolution scheme may also consider which nodes have the most recent information about the first object. In some examples, if the first object is part of a simulation island, then the node which already has simulation authority for the simulation island may be selected.

As described above, the owner of the claimed object may make a determination regarding multiple simulation authority claims to an object based on factors such as what information each node has about the claimed object and the number of objects that each node has that is interacting with the claimed object. If the first object is expected to interact with a simulation island, the first object may be expected to further interact with other objects in the simulation island, and the owner of the first object may select the node which has simulation authority for the simulation island to assume simulation authority for the first object.

The selected node may continue to perform simulation of the first object and send the simulation data to the owner of the first object. The owner may forward simulation data received from the selected node to the other nodes that have replicas of the first object. Although other nodes claiming simulation authority may continue simulation of the first object, only the data from the selected node is passed on to the nodes that have replicas of the first object.

Figure 7:
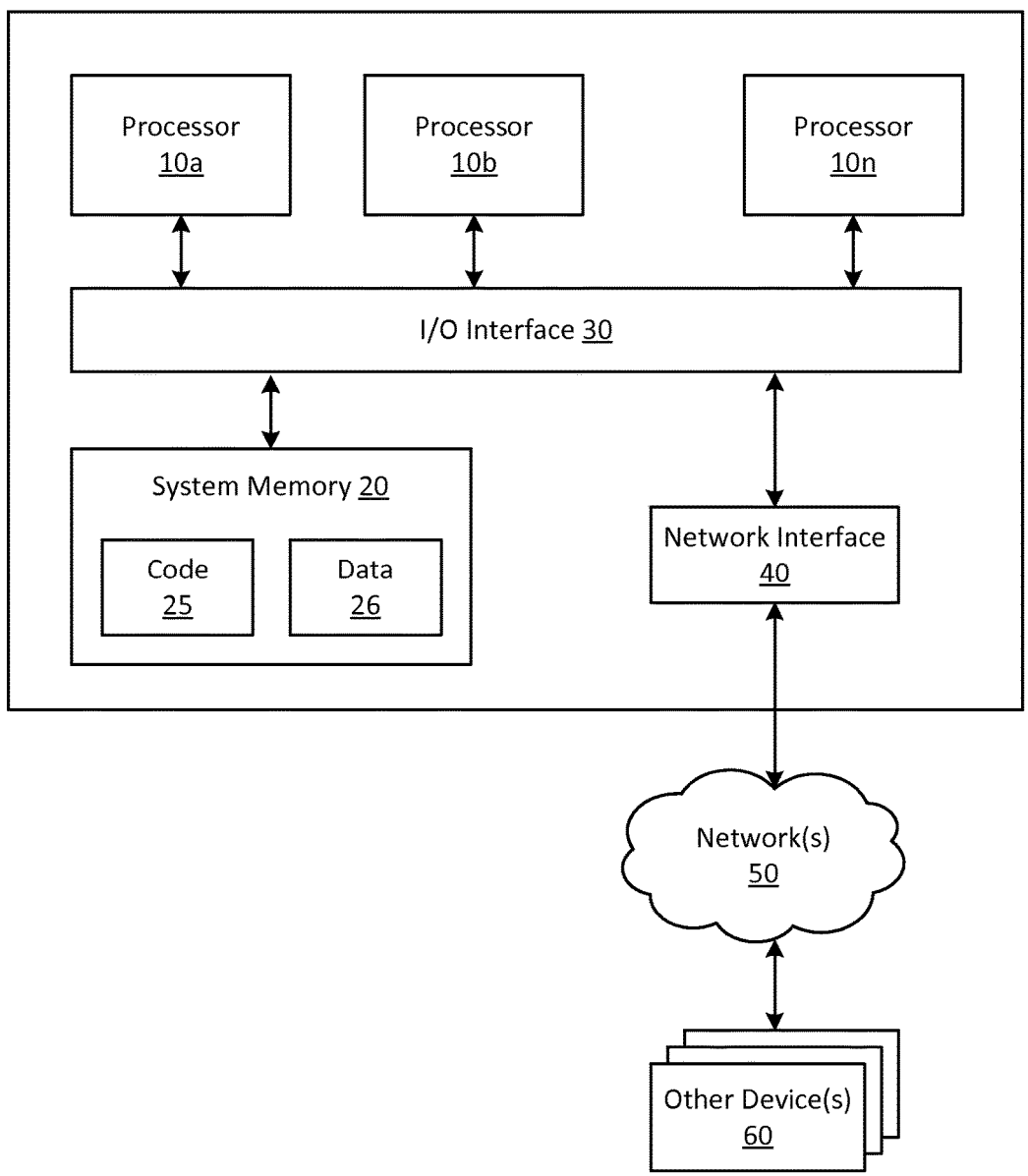
FIG. 7 is a diagram illustrating an example computing system that may be used in accordance with the present disclosure.

In at least some embodiments, one or more nodes that implement a portion or all of one or more of the technologies described herein may include or may be associated with a computer system that includes or is configured to access one or more computer-accessible media. A node, which may be referred to also as a compute node or a computing node, may be implemented on a wide variety of computing environments, such as commodity-hardware computers, virtual machines, web services, computing clusters and computing appliances. Any of these computing devices or environments may, for convenience, be described as nodes. FIG. 7 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems. The term "computing device," as used herein, refers to at least all these types of devices and is not limited to these types of devices.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth.

Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for simulating a first object associated with virtualized content, comprising:
    a plurality of computing nodes in a multi-node computing environment, the plurality of computing nodes in communication with each other; and
    one or more memories on the plurality of computing nodes having stored thereon computer-executable instructions that, upon execution, cause the system to perform operations comprising:
        assigning ownership of the first object in a simulation scenario to a first node based at least in part on a first set of criteria;
        detecting a change in the simulation scenario, the change including a change associated with the first object;
        assuming simulation authority, by at least a second node, of the first object, wherein the assuming the simulation authority is based at least in part on a second set of criteria, including when the first object is interacting with other objects or data being simulated by the first node;
        performing, by the second node, simulation of the first object, wherein the second node begins to perform the simulation before the first node acknowledges assumption of the simulation authority by the second node;
        acknowledging, by the first node, the assumption of the simulation authority by the second node; and
        maintaining the ownership, by the first node, of the first object during at least part of a time that the second node has the simulation authority of the first object.

2. The system of claim 1, wherein the operations further comprise relinquishing the simulation authority of the first object by the first node.

3. The system of claim 1, wherein the operations further comprise resolving, by the first node, conflicting claims to the simulation authority of the first object based at least in part on a conflict resolution scheme.

4. The system of claim 3, wherein multiple nodes claiming the simulation authority of the first object perform simulation of the first object without the first node acknowledging multiple claims of simulation authority.

5. The system of claim 3, wherein the first set of criteria comprises at least one of:
    a criterion that the second node has at least one other simulation authority of at least one other object that is interacting with the first object;

a criterion that no other computing node currently has the simulation authority of the first object; and a criterion that the second node has a threshold amount of information about the first object.

6. A method of object simulation in a multi-node environment comprising a plurality of nodes for simulating virtualized content, the plurality of nodes comprising a processor and memory, the method comprising:

detecting a change associated with a simulated object;

assuming simulation authority, by a first node of the plurality of nodes, of the simulated object owned by a second node of the plurality of nodes, the simulation authority based at least in part on a first set of criteria, wherein the second node maintains ownership of the simulated object while the first node assumes the simulation authority;

performing, by the first node, simulation of the simulated object, wherein the first node begins to perform the simulation before the second node acknowledges assumption of the simulation authority; and receiving, from the second node, acknowledgment of the assumption of the simulation authority.

7. The method of claim 6, wherein the second node maintains the ownership of the simulated object during at least part of a time that the first node has the simulation authority of the simulated object.

8. The method of claim 6, wherein the first node assumes the simulation authority when the simulated object is interacting with other data or objects being simulated by the first node.

9. The method of claim 6, wherein an owner of the simulated object can create or destroy the simulated object.

10. The method of claim 6, wherein the simulation authority of the simulated object is relinquished by the first node when the simulated object is no longer in motion or interacting with other data or objects being simulated by the first node.

11. The method of claim 6, further comprising notifying other nodes of the multi-node environment that a change in the ownership is pending.

12. The method of claim 6, wherein said simulation authority is determined based in part on prediction of movement of simulated objects.

13. The method of claim 6, wherein the acknowledgment is based on resolution, by an owner of the simulated object, of conflicting claims to the simulation authority of the simulated object.

14. The method of claim 6, wherein the first set of criteria comprises having a threshold amount of information associated with the simulated object.

15. One or more non-transitory computer-readable storage media having stored thereon instructions that, upon execution on at least one computing device, cause the at least one computing device to perform operations comprising:

detecting a change associated with a simulated object in a multi-node environment comprising a plurality of nodes that simulate virtualized content;

assuming simulation authority, by a first node of the plurality of nodes, of the simulated object owned by a second node of the plurality of nodes, the simulation authority based at least in part on a first set of criteria, wherein the second node maintains ownership of the simulated object while the first node assumes the simulation authority;

performing, by the first node, simulation of the simulated object, wherein the first node begins to perform the simulation before the second node acknowledges assumption of the simulation authority; and receiving, from the second node, acknowledgment of the assumption of the simulation authority.

16. The one or more non-transitory computer-readable storage media of claim 15, wherein the second node maintains the ownership of the simulated object during at least part of a time that the first node has the simulation authority of the simulated object.

17. The one or more non-transitory computer-readable storage media of claim 15, wherein the first node assumes the simulation authority when the simulated object is interacting with other data or objects being simulated by the first node.

18. The one or more non-transitory computer-readable storage media of claim 15, wherein an owner of the simulated object can create or destroy the simulated object.

19. The one or more non-transitory computer-readable storage media of claim 15, wherein the simulation authority of the simulated object is relinquished by the first node when the simulated object is no longer in motion or interacting with other data or objects being simulated by the first node.

20. The one or more non-transitory computer-readable storage media of claim 15, further comprising notifying other nodes of the multi-node environment that a change in the ownership is pending.

\* \* \* \* \*